March 26, 1957 A. M. LEVINE 2,786,886

COLOR TELEVISION RECEIVER

Filed Oct. 20, 1952

INVENTOR
ARNOLD M. LEVINE
BY
Ernest Fanwick
ATTORNEY

United States Patent Office 2,786,886

Patented Mar. 26, 1957

2,786,886

COLOR TELEVISION RECEIVER

Arnold M. Levine, River Edge, N. J., assignor to International Telephone and Telegraph Corporation, a corporation of Maryland Application October 20, 1952, Serial No. 315,614

9 Claims. (Cl. 178—5.4)

This invention relates to a color television receiver and more particularly to a color television receiver for use with a field sequential color television system which increases the apparent definition of the received picture.

It is well known that color information is lost long before picture definition, all other factors being equal. That is, from a distance a person is able to determine what an object is before that same individual can tell the color of that object. For example, a person can see the slats in a picket fence at a much greater distance than he can distinguish the color of the same slats.

It has been argued that although a presently known field sequential color television system suffers a loss of definition, the added contrast in color creates an effect of increased definition countering this loss so that it is unnoticeable. It is realized, however, that a system that increases apparent color definition of the received color television signal is extremely desirable provided it is simple, economical, and compatible with existing field sequential color television systems.

One of the objects of this invention, therefore, is to provide a color television receiver for use with a field sequential color television system which increases the apparent color definition of the received picture.

Another object of this invention is to provide a color television receiver capable of increasing the apparent color definition of the received picture which is compatible with presently known field sequential color television systems.

A further object of this invention is to provide a method for the reception of field sequential color television signals which will increase the apparent definition of the received light image.

A feature of this invention is the use of a conventional color television receiver which has the output of its video amplifier delayed in time before it is fed to the cathode of the picture tube. Before the time delay expires, information is obtained from the output of the video amplifier which is ultimately fed as a blanking signal to the grid of the picture tube. The resulting picture image on the face of the cathode ray tube has a fine black line drawn around the color areas, thus increasing the apparent definition of the received picture.

The above-mentioned and other features and objects of this invention will become more apparent by reference to the following description taken in conjunction with the accompanying drawings, in which.

Figure 1:
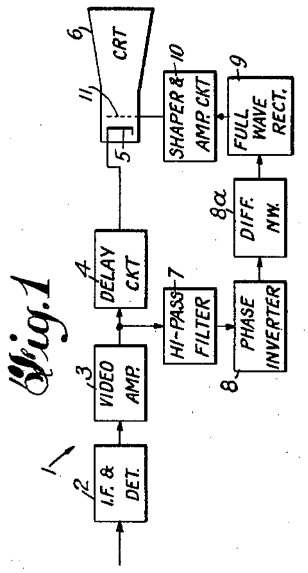
Fig. 1 is a block diagram of a color television receiver modified in accordance with the principles of this invention.

Referring to Fig. 1, a color television receiver in accordance with the principles of this invention is shown wherein the received signal is coupled to a color television receiver 1 and fed through the usual front-end circuitry including an intermediate frequency and detector stage 2 and the usual video amplifier stage 3. The output of video amplifier 3 is coupled through delay line 4 to the cathode 5 of the picture tube 6. By means of a high pass filter 7, coupled to the output of video amplifier 3, the high frequency components of the detected television signal are segregated. These high frequency components are fed through phase inverter 8, which compensates for the inversion due to filter 7. The output of phase inverter 8 is differentiated in network *8a*, whose output is coupled to a full wave rectifier 9. The rectified output is shaped and amplified in circuit 10. The output of circuit 10, being of proper amplitude and correct shape to momentarily blank the screen of picture tube 6, is fed to grid 11.

Figure 2:
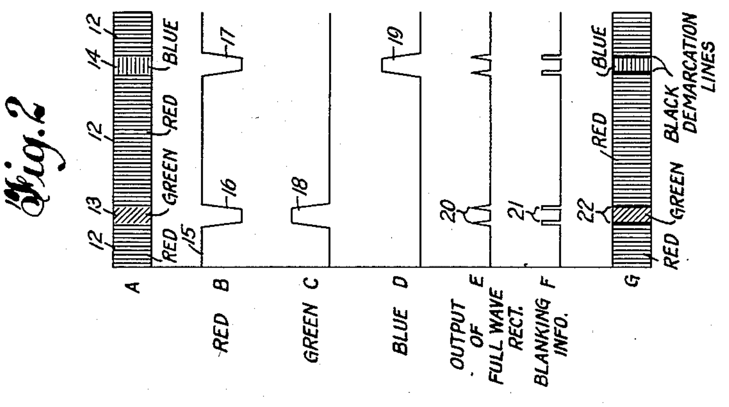
Fig. 2 shows various curves helpful in the explanation of this invention.

Referring to Fig. 2, let it be assumed for purposes of explanation that the field to be scanned comprises an object divided into a plurality of colored areas as shown in curve A, wherein the areas designated 12 are red, the area 13 is green, and the area 14 is blue. As shown in curve B, the voltage level for the red scan will be high at point 15 where it represents the first colored area 12 of curve A. The voltage level of the red scan will be zero at points 16 and 17 where only the other primary colors green and blue can be represented. Curves C and D show the voltage levels for the green and blue primary color scans, respectively. Curve C shows a high voltage at 18 representing colored area 13 of curve A, which curve D shows a high voltage at point 19 representing colored area 14 of curve A. It is obvious to those skilled in the art that in order to re-create the sharp division of color in the receiver when the received signals represent a change from one colored area to another, the definition will depend upon the high frequency components of the received color signals of curves B, C, and D. These high frequency components are filtered, inverted, and differentiated as previously explained in reference to Fig. 1. The differentiated output, when passed through the full wave rectifier, comprises a series of pulses 20 at those points where the color signals B, C, and D have high frequency components or, to put it another way, where there is a sharp color definition in the object being scanned, such as between areas 12 and 13. These pulses 20 from the full wave rectifier are coupled to the shaper and amplifier circuit 10 of Fig. 1. Pulses 21 of curve F, Fig. 2, represent the shaped and amplified pulse output of circuit 10. The amplitude is sufficient to blank the cathode ray tube screen when the pulses 21 are applied to the grid. Because the screen is blanked each time there is a sharp change in color of the object scanned, it is apparent that, as shown in curve G, Fig. 2, a thin black demarcation line 22 will appear on the picture screen between the colored areas, thus sharply defining the color outline of the object scanned.

Figure 3:
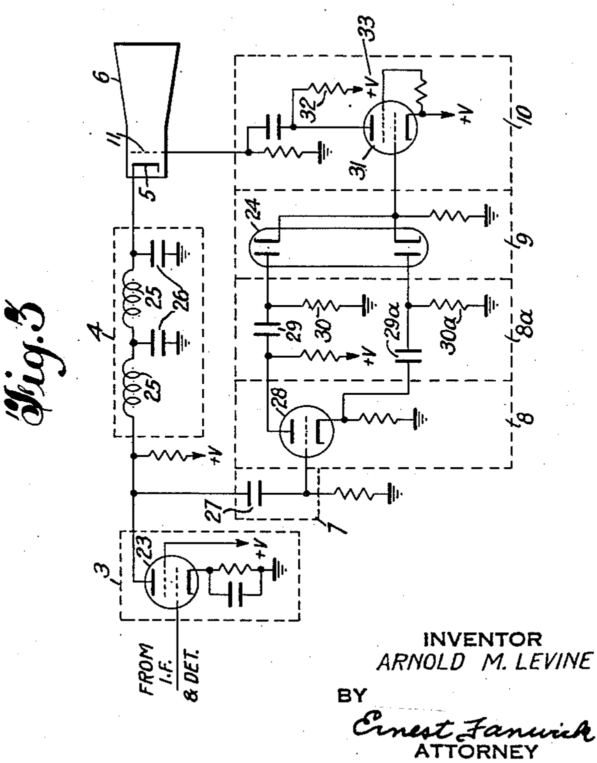
Fig. 3 is a schematic circuit diagram of one embodiment of the television receiver in this invention.

Referring to Fig. 3, a schematic circuit diagram of one embodiment of the television receiver of this invention is shown wherein the dotted line blocks contain the equivalents of the blocks shown in Fig. 1 and are designated with the same reference characters. The input from the I. F. and detector circuit is coupled to one grid of the vacuum tube 23 which, with its associated components, comprises the video amplifier 3. The output taken from the plate of vacuum tube 23 is coupled to delay line 4 comprising inductances 25 and capacitors 26. The values of the components in delay line 4 are so adjusted that the received video components are coupled to the cathode 5 of the picture tube in synchronism with the blanking signals from shaper-amplifier circuit 10. The high frequency components of the video amplifier output are coupled through high pass filter 7, which includes capacitor 27, to the grid of vacuum tube 28. Vacuum tube 28 and its associated components act as a phase inverter 8 which compensates for the phase inversion of the high frequency signals coupled through capacitor 27. Of course, it is obvious to one skilled in the art that the position of the phase inverter and high pass filter may be interchanged so that first phase inversion will occur and then frequency filtering. The output of phase inverter 8 is coupled to a differentiating network 8*a* comprising condensers 29 and 29*a* and resistors 30 and 30*a*. The differentiated output of the network 8*a* is coupled to the full wave rectifier 9 comprising a dual diode whose output is coupled to the grid of vacuum tube 31 in the shaper and amplifier circuit 10. The amplitude of the plate output of vacuum tube 31, adjusted by means of resistor 32 and associated positive voltage source 33, is coupled to the grid 11 of the picture tube 6, thus blanking the picture tube 6 whenever the detected video input to the cathode 6 would represent a change in color values enabling an observer to see a thin black line of demarcation around the perimeter of each colored object, increasing the apparent definition of the received picture.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a color television receiver adapted to receive sequential color television signals including video signals having successive portions representing different values of a selected plurality of colors, said signals including high frequency components representative of a change of color in the elemental areas of the image being received, said receiver having means for detecting said video signals and having a cathode ray tube for reproducing said image from said detected video signals, means to apply said detected signals to an electrode of said tube for reproduction of images from said detected signals, high frequency filtering means coupled to the output of said detecting means to separate the high frequency components from said detected video signal, means responsive to the separated high frequency components of said detected video signal to generate blanking signals, and means coupled to the output of said blanking signal generating means to couple said blanking signals to an electrode of said cathode ray tube to emphasize lines of demarcation between differently colored areas of the image being received.

2. A color television receiver according to claim 1, wherein the means to generate said blanking signals includes means for shaping the component as a biasing signal.

3. A color television receiver according to claim 1, wherein said tube includes cathode and grid electrodes, said means for applying sequential signals to said cathode electrode includes a signal delay means, and said means for applying said blanking signals includes means for preparing said blanking signals as a biasing signal for said grid electrode.

4. A color television receiver for operating from received signals of a television transmitter wherein field sequential color television signals including video signals having successive portions representing different values of a selected plurality of colors, said signals including high frequency components representative of a change of color in the elemental areas of the image being received are transmitted comprising means for detecting said video signals, a filter coupled to the output of said detection means for separating high frequency components of said detected signals, means coupled to the output of said detection means to delay said detected signals, means coupled to the output of said filtering means to invert the phase of said filtered components, means coupled to the output of said phase inversion means to rectify said phase inverted components, shaper means coupled to the output of said rectifier means to shape said rectified components to produce blanking signals, and means to combine said delayed received signals and said blanking signals to emphasize lines of demarcation between differently colored areas.

5. A receiver according to claim 4, which further includes means to differentiate said phase inverted components before rectification.

6. A receiver according to claim 4, wherein said rectifier comprises a full wave rectifier.

7. A receiver according to claim 4, wherein said means to combine said delayed received signals and said blanking signals include a cathode ray tube.

8. A receiver according to claim 4, wherein said means to filter the high frequency components of said received signals includes a capacitive element.

9. A color television receiver adapted to receive field sequential color television signals including video signals having successive portions representing different values of a selected plurality of colors, said signals including high frequency components representative of a change of color in the elemental areas of the image being received, comprising means for detecting said transmitted video signals, means to delay said detected signal, cathode ray tube means having at least a cathode and grid electrode, means to couple said delayed signals to said cathode, means to filter said high frequency components from said detected signal, means to invert the phase of said high frequency components, means to differentiate the output of said phase inverter means, means to rectify the output of said differentiating means, means to shape the output of said rectifier means, and means to couple said shaped output to the grid of said cathode ray tube to emphasize lines of demarcation between differently colored areas.

References Cited in the file of this patent

UNITED STATES PATENTS

| | | |
|---|---|---|
| 2,492,926 | Valensi | Dec. 27, 1949 |
| 2,587,074 | Sziklai | Feb. 26, 1952 |